United States Patent [19]

Lien

[11] Patent Number: 5,261,090
[45] Date of Patent: Nov. 9, 1993

[54] SEARCH ARRANGEMENT ADAPTED FOR DATA RANGE DETECTION

[75] Inventor: Robert L. Lien, Batavia, Ill.

[73] Assignee: AT&T Bell Laboratories, Murray Hill, N.J.

[21] Appl. No.: 536,819

[22] Filed: Jun. 12, 1990

[51] Int. Cl.⁵ .................. G06F 7/22; G06F 15/417
[52] U.S. Cl. .................. 395/600; 364/DIG. 2; 364/259.2; 364/259.4; 364/962; 364/963; 364/963.1
[58] Field of Search ......................... 395/600

[56] References Cited

U.S. PATENT DOCUMENTS

| | | | |
|---|---|---|---|
| 3,611,316 | 10/1971 | Woodrum | 395/800 |
| 4,633,391 | 12/1986 | Rundell | 395/800 |
| 4,674,039 | 6/1987 | Chouery | 364/900 |
| 4,736,296 | 4/1988 | Katayama et al. | 364/200 |
| 5,010,483 | 4/1991 | Mishina et al. | 364/DIG. 1 |

Primary Examiner—Eddie P. Chan
Attorney, Agent, or Firm—David Volejnicek

[57] ABSTRACT

A range of data that is included in a data file is represented among the records of the file by a record of a lower limit of the range and a separate, sequential, record of an upper limit of the range. Each searchable representation of a record, such as a table entry, has a pair of flags to identify the record as a range low limit or a range high limit, or neither. When a conventional binary search of the ordered file records is performed and completed and the sought-for datum is not found, the record last examined during the search is checked. If that last record is lower in the order than the sought-for datum and its low range limit flag is set, or if the record is higher in the order than the sought-for datum and its high range limit flag is set, then the sought-for datum is in the file and is a member of the included range.

16 Claims, 3 Drawing Sheets

*FIG. 1*

| H FLAG | L FLAG | TELEPHONE NUMBER | ROUTE NUMBER |
|---|---|---|---|
| 0 | 0 | 555-123-0000 | 3 |
| 0 | 1 | 555-123-6000 | 1 |
| 1 | 0 | 555-123-7000 | 1 |

SEARCH ARRANGEMENT ADAPTED FOR DATA RANGE DETECTION

TECHNICAL FIELD

This invention relates to binary searches of files of data records.

BACKGROUND OF THE INVENTION

Searching through collections (referred to herein by the generic term "files") of data records for those records that have a particular characteristic, is an important and often-performed activity in a wide variety of computer applications. In telephony, for example, routing tables must be searched for each attempted call in order to find a route that corresponds to the dialed number. One of two techniques is conventionally employed for searching: a binary search or a hashing search. This application relates to the binary search.

If all possible sequential data records within a range of record values are included in a file, it is desirable to enter in the table, list, database, or other representation of the file, merely an indication that the whole range is included, as opposed to individually entering therein each record that is within the range. This serves to markedly reduce the size of the representation of the file. In telephony, for example, it is common that all telephone numbers within a range are valid numbers and all have the same route associated therewith. The size of the routing table is significantly reduced if the table contains as an entry the range limits in association with the route, as opposed to containing a separate entry for each telephone number within the range.

In conventional implementations of searchable files, indications of included ranges are made as double-width entries. That is, fields within a *single* data record are used to store both the upper and the lower limit of the range. In telephony routing tables, where each entry typically occupies a single word of memory, it means that the memory words have to be wide enough to store side-by-side the two telephone numbers that represent the range limits, along with the route number.

This way of representing ranges produces problems. Firstly, this approach requires the use of wider-than-normal, e.g., double-width, memories in order to accommodate words of the requisite width. Use of such memories entails additional cost, especially in conjunction with hardware implementations of search mechanisms. Secondly, during a binary search, this approach requires an additional compare operation per examined entry: the searched-for data record has to be compared against both range limits that are included in the entry. Doubling of the required number of sequential software operations markedly increases the search time. Consequently, inclusion of range entries within binary-searchable files of data entries has typically produced a mixed blessing of advantages and disadvantages.

SUMMARY OF THE INVENTION

This invention is directed to solving these and other disadvantages of the prior art. According to the invention, firstly, a range of data that is included in a data file is represented among the records of the file by a record of a lower limit of the range and a separate, sequential, record of an upper limit of the range. Secondly, a binary-search arrangement for searching the ordered data records of the file for a predetermined datum performs a binary search—illustratively a standard binary search—of the file for the predetermined datum by examining the data records, upon completion of the search determines whether the record last examined during the search is one of (a) the record of the lower range limit and lower in the order than the predetermined datum, and (b) the record of the upper range limit and higher in the order than the predetermined datum, and gives an indication that the predetermined datum is included in the file if either (a) or (b) is found to be true.

Because the invention uses two separate, i.e., sequential, records, as opposed to a single, double-width parallel, record to represent range limits, unlike the prior art, it avoids the need for extra-wide memories capable of storing extra-wide range records, and extra-wide comparators for processing those records. Hence, the costs of storing and comparing range entries are markedly reduced.

Moreover, the invention's arrangement for performing a binary search of records that are so represented is easy to implement in software or hardware. In a software implementation, there is a significant decrease in search time as compared with the prior art, due to fewer compare operations per record. When implemented in hardware, the arrangement is as fast and less costly and complex per file record searched than prior art arrangements. Moreover, since the invention's binary search arrangement has to search a shorter file than the prior-art arrangements that do not use range entries, it is significantly faster than both prior-art software and hardware arrangements in performing binary searches.

These and other advantages and features of the present invention will become apparent from the following description of an illustrative embodiment of the invention taken together with the drawing.

BRIEF DESCRIPTION OF THE DRAWING

FIG. 1 is a block diagram of a representation of a range-inclusive file, that includes an illustrative embodiment of a first aspect of the invention;

DETAILED DESCRIPTION

Figure 2:
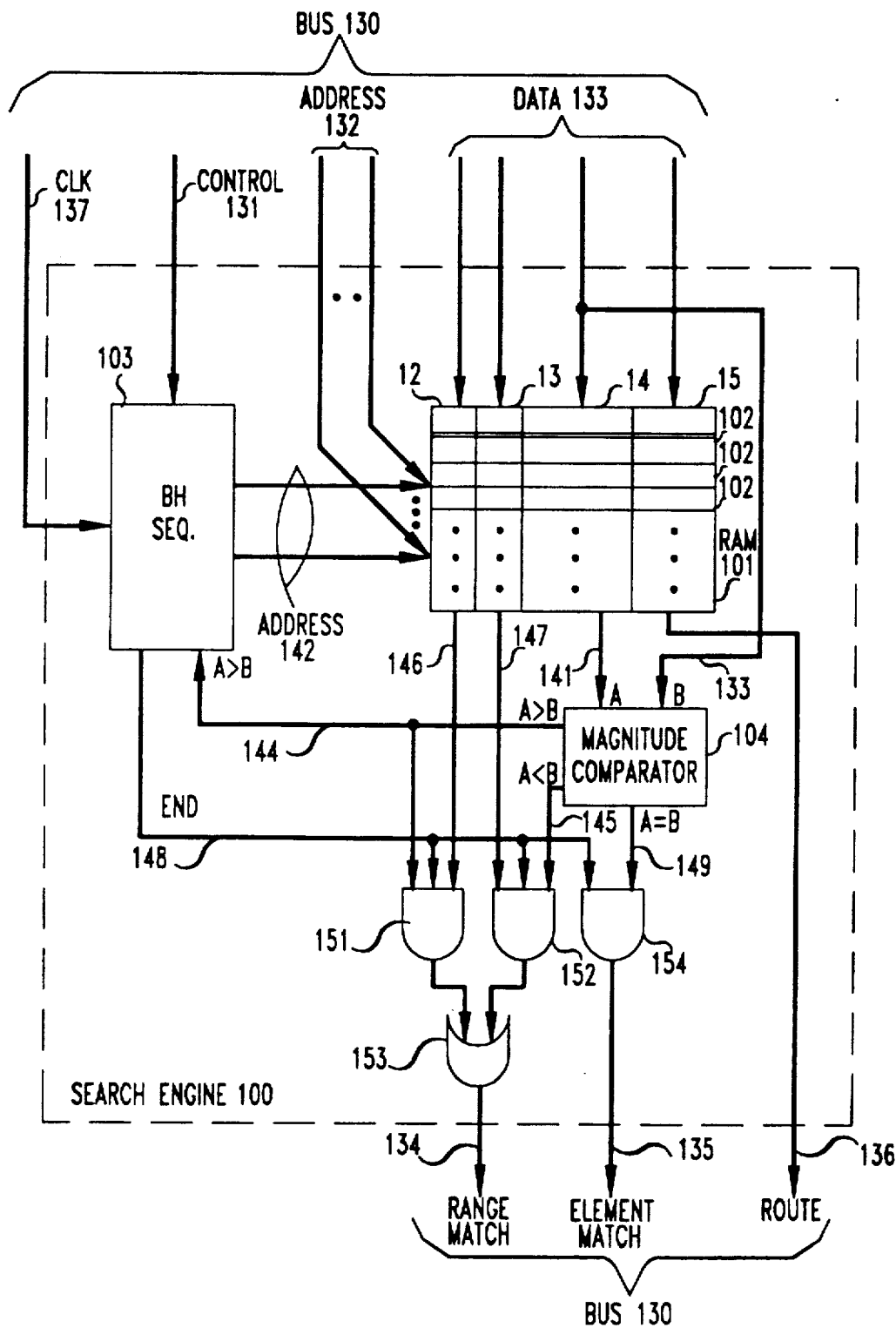
FIG. 2 is a block diagram of a hardware-implemented binary-search arrangement for searching the file of FIG. 1, that includes an illustrative embodiment of a second aspect of the invention.

FIG. 1 shows an illustrative implementation of a file of records that includes range entries. The file is represented as a table 10 that includes an ordered list of entries 11. Each entry 11 represents a single record of the file. Each entry 11 comprises a plurality of fields 12-15. Table 10 is illustratively a telephone network routing table, and each entry 11 includes a telephone number field 14 for storing telephone numbers, and a route number field 15 for identifying the telephone number's associated route through the telephone network. It will be noted that each entry 11 is only one record wide. Each entry 11 contains only one telephone number field 14. That field 14 contains only one telephone number even if that telephone number is one of the limits of a range of telephone numbers included in table 10. Consequently, it takes a pair 16 of sequential entries 11 to represent a range in table 10. All of the numbers within the range have the same route associated therewith. For the purpose of representing ranges, each entry includes a pair of range-limit flags 12 and 13. In an entry 11 that represents an individual record, as opposed to a range limit, fields 12 and 13 are null. In an entry that represents the lower bound or limit of a range, low-limit (L) flag 13 is set and flag 12 is null. In an entry that represents the upper bound or limit of a range, high-limit (H) flag 12 is set and flag 13 is null.

In the illustrative example of FIG. 1, entries 11 are ordered sequentially by telephone number in ascending order. The lower and upper limits of a single range are represented in table 10 by respective sequentially-adjacent entries 11, and together form a pair 16 of range limit entries 11. The illustrative example of FIG. 1 shows that telephone number 555-123-0000 is in the file of table 10, that it has route number 3 associated with it, and that it is an individual-record, non-range limit, entry. FIG. 1 also shows that the range of telephone numbers 555-123-6000 through 555-123-7000 are all included in the file of table 10, that all of them have route number 1 associated with them, and that telephone number 555-123-6000 is the lower limit of the range while telephone number 555-123-7000 is the upper limit of the range.

To determine whether a given phone number is included in table 10, a binary search is performed on field 14 of entries 11. The binary search technique is well-known in the art. According to the invention, the binary search technique has been expanded to accommodate searching through files containing range entries and represented in the manner of table 10 of FIG. 1.

FIG. 2 shows a hardware binary search engine 100 for searching table 10 and constructed according to the invention. Engine 100 includes a RAM 101 which implements—contains—table 10. Each entry 11 of table 10 is implemented by a separate addressable word 102 of RAM 101. For communicating with the outside world, engine 100 is connected to a bus 130. Address leads 132 and data leads 133 of bus 130 are connected to RAM 101 to enable the loading of table 10 into RAM 101. Also connected to RAM 101, via address leads 142, is a conventional binary hunt (BH) sequencer 103, such as the AMD 2502 successive approximation register (SAR). During a search, BH sequencer 103 generates the addresses of RAM 101 words 102 whose contents are searched, and hence implements the binary search algorithm. During a search, BH sequencer 103 generates ($\log_2 N$)+1 addresses, where N is the number of entries 11 in table 10. In response to each address generated by BH sequencer 103, RAM 101 outputs, on leads 146, 147, 141, and 136 emanating therefrom, an entry 11 that is contained in the addressed one of words 102 of RAM 101. BH sequencer 103 starts generating addresses in response to a start signal received over control lead 131 of bus 130, and generates one address per clock signal received over CLK lead 137 of bus 130.

Engine 100 also includes a magnitude comparator 104 that has a pair of input ports A and B. Input port A is connected to lead 141 on which RAM 101 outputs telephone number field 14 of addressed entries 11, while input port B is connected to data leads 133 of bus 130. Magnitude comparator 104 is a conventional comparator, such as the 74LS684 device of Texas Instruments, Inc., that compares values received at its input ports A and B and generates signals indicative of their relative magnitudes. If the value received at port A exceeds the value received at port B, comparator 104 generates a signal on lead 144, designated as A>B. If the received values are equal, comparator 104 generates a signal on lead 149, designated as A=B. If the value received at port B exceeds the value received at port A, comparator 104 generates a signal on lead 145, designated as A<B.

Lead A>B 144 is connected to a control input of BH sequencer 103 to provide the feedback needed by sequencer 103 to generate the addresses for a binary search. When sequencer 103 has completed generating the last address of a binary search, it generates a signal on END lead 148. END lead 148 and A>B lead 144 are connected to inputs of an AND gate 151 along with an H flag 12 output lead 146 of RAM 101. END lead 148 and A<B lead 145 are connected to inputs of an AND gate 152, along with an L flag 13 output lead 147 of RAM 101. Outputs of AND gates 151 and 152 are connected to inputs of an OR gate 153, whose output is connected to a range match lead 134 of bus 130. End lead 148 and A=B lead 149 are connected to inputs of an AND gate 154, whose output is connected to an element match lead 135 of bus 130. Finally, route number field 15 output of RAM 101 is connected to route leads 136 of bus 130.

The operation of engine 100 is as follows. When a search is to be performed, a searched-for telephone number is input to port B of magnitude comparator 104 via data leads 133, and a start signal and clock signals are input to BH sequencer 103 over control lead 131 and CLK lead 137, respectively. BH sequencer 103 starts generating addresses of RAM 101 words 102, and the entries 11 contained by the addressed words 102 are output by RAM 101 on leads 146, 147, 141, and 136. Output contents of telephone number field 14 enter comparator 104 at input port A, and are compared therein with the searched-for telephone number. Each comparison results in a signal being generated by comparator 104 on one of the leads 144, 145, and 149.

When the binary search has been completed, entry 11 contained by the last word 102 addressed by BH sequencer 103 is present at outputs 146, 147, 141, and 136 of RAM 101, and sequencer 103 generates a signal on end lead 148. If the sought-for telephone number is contained by a field 14 of a word 102, it is now present at input A of comparator 104, and comparator 104 is generating a signal on A=B lead 149. That, and the presence of the signal on end lead 148, cause gate 154 to generate a signal on element match lead 135, indicating that the sought-for telephone number is included in table 10, and its corresponding route appears on route leads 136.

If the sought-for telephone number is not contained by a field 14 of a word 102, the next-highest or next-lowest telephone number that is contained by a field 14 of a word 102 is now present at input A of comparator 104, and comparator 104 is generating a signal on one of the leads A>B 144 or A<B 145, but not on lead A=B 149. Hence, no signal is issued on element match lead 135. If the telephone number which is output by RAM 101 is an individual, non-range entry, values output by RAM 101 on leads 146 and 147 are null, and hence no signal is issued on range match lead 134. The lack of signals on leads 134 and 135 indicates that the sought-for number is not included in table 10.

However, if the telephone number which is output by RAM 101 is a range entry, one of its corresponding range limit flags 12 or 13 is not null, and hence RAM 101 is putting out a signal on lead 146 or 147. If there is a signal on lead 146, identifying the corresponding telephone number as a high range limit, and there is also a signal on lead 144, indicating that the sought-for number is lower than the high range limit, gate 151 generates a signal which gate 153 outputs on range match lead 134. Similarly, if there is a signal on lead 147, identifying the corresponding telephone number as a low range limit, and there is also a signal on lead 145, indicating that the sought-for number is higher than the low range limit, gate 152 generates a signal which gate 153 outputs on range match lead 134. A signal on lead 134 indicates that the sought-for telephone number is included in a range of numbers that is included in table 10, and its corresponding route appears on route leads 136.

Figure 3:
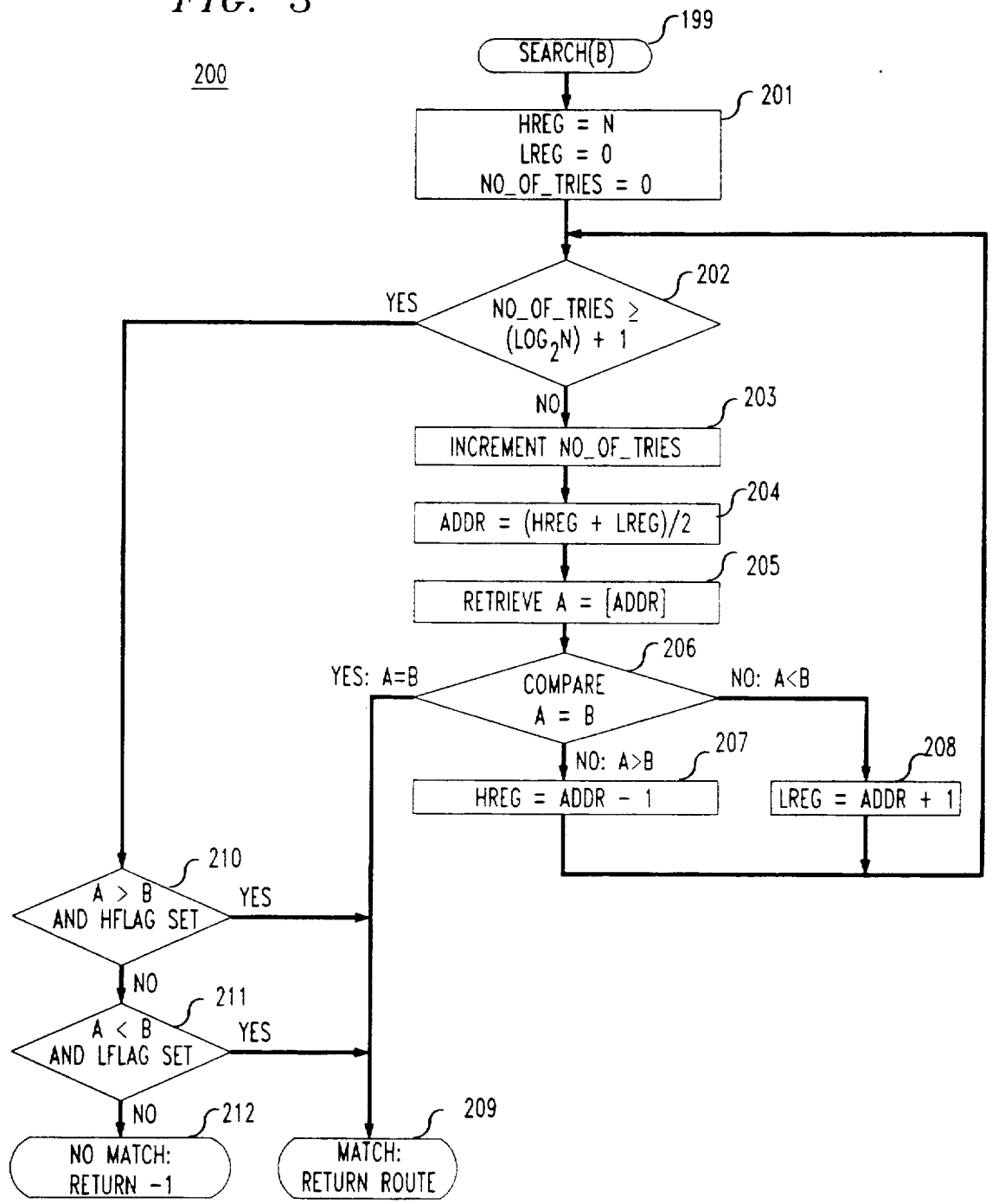
FIG. 3 is a flow diagram of the operation of a software-based binary-search arrangement for searching the file of FIG. 1, that also includes an illustrative embodiment of the second aspect of the invention.

FIG. 3 shows a software binary-search routine 200 for searching table 10 and constructed according to the invention. When stored in a memory (not shown) and executed therefrom by a processor (not shown), in the conventional manner, routine 200 forms the core of an alternative implementation of the search engine 100 of FIG. 2.

When routine 200 is invoked, the sought-for telephone number, designated as B, is passed to routine 200 as a parameter, at step 199. In response to its invocation at step 199, routine 200 initializes variables LREG, and NO_OF_TRIES to zero, and initializes variable HREG to a value N, where N is the number of entries 11 in table 10, at step 201. Next, routine 200 checks whether the value of NO_OF_TRIES variable is equal to ($\log_2 N$)+1, at step 202, to determine whether the binary search has been exhausted. It will be noted that the extra search iteration (+1) is necessary to ensure that a searched-for record is checked against *both* range limits in *all* cases. If the search is not exhausted, routine 200 increments the value of NO_OF_TRIES variable, at step 203. Next, routine 200 calculates a value for a variable ADDR, in step 204. The variable ADDR is an offset pointer into table 10. By adding the last high address, in variable HREG, and the last low address, in variable LREG, and dividing the sum by 2, this step always selects the mid-point between the last high and low pointers. Hence, the initial value of variable ADDR is the mid-point of table 10. At step 205, routine 200 retrieves entry 11 from table 10 which is pointed to by variable ADDR. Next, routine 200 compares the telephone number from field 14 of the retrieved entry 11, designated as A, with the sought-for telephone number B, at step 206, to determine if they match. If they do match, the search is over, and routine 200 returns the route number from field 15 of the retrieved entry 11, at step 209. If they do not match and telephone number A is smaller than telephone number B, routine 200 sets the variable LREG to the value of variable ADDR+1, at step 208, to mark the new low-limit address point, and returns to step 202 for the next try. If the compared telephone numbers do not match at step 206 and telephone number A is larger than telephone number B, routine 200 sets variable HREG to the value of variable ADDR−1, at step 207, to mark the new high-limit address point, and returns to step 202 for the next try.

If the NO_OF_TRIES variable is found to be equal to or greater than ($\log_2 N$)+1 in step 202, indicating that the binary search has been exhausted without a match having been found, routine 200 starts the range tests. At step 210, routine 200 determines if telephone number A is larger than telephone number B and if the value of HFLAG field 12 of the retrieved entry 11 is set. If so, the sought-for telephone number B is a member of a range of numbers that are included in table 10, and routine 200 proceeds to step 209 to return the routine number from field 15 of the retrieved entry 11. If the conditions of step 210 are not met, routine 200 checks if telephone number A is smaller than telephone number B and if the value of LFLAG field 13 of the retrieved entry 11 is set, at step 211. If so; the sought-for telephone number B is a member of a range of numbers that are included in table 10, and routine 200 proceeds to step 209 to return the route number from field 15 of the retrieved entry 11. If the conditions of both steps 210 and step 211 are not met, the sought-for telephone member B is not included in the file of table 10, and routine 200 returns an indication to that effect, at step 212.

Of course, it should be understood that various changes and modifications may be made to the above-described illustrative embodiment of the invention. For example, the telephone numbers in the table need not be 10-digit numbers, but may be numbers of varied length, making the table a universal translator table. Or, the table need not be a routing table ordered by telephone number, but may represent any file of any records ordered according to any desired characteristic that will serve as the key for the search. Such changes and modifications may be made without departing from the spirit and the scope of the invention. It is therefore intended that such changes and modifications be covered by the following claims.

What is claimed is:

1. A binary search arrangement for searching sequentially ordered data records of a data file, the data file defining a range of included data, the range being represented among the records by a record that is marked as a lower limit of the range and a separate record that is marked as an upper limit of the range, comprising;
    means for performing a binary search of the file for a predetermined datum, by examining the data records in a binary search sequence and for indicating completion of the binary search;
    means responsive to the indication of the completion of the binary search by the performing means, for examining the marking and the associated data of a last-examined one of the records to determine whether the last-examined one of the records examined by the performing means during the search is one of (a) marked as the lower range limit and lower in order than the predetermined datum, and (b) marked as the upper range limit and higher in the order than the predetermined datum; and
    means responsive to a determination by the determining means that one of (a) and (b) is true, for giving an indication that the predetermined datum is included in the file.

2. The arrangement of claim 1 wherein
    the record marked as the lower limit includes a first flag identifying this record;
    the record marked as the upper limit includes a second flag identifying this record;
    the performing means include means for comparing relative ordering of the predetermined datum with an examined data record; and
    the determining means include
    means for determining whether (c) the last-examined record includes the first flag and the comparing means indicate that the last-examined record is lower in the order than the predetermined datum, and means for determining whether (d) the last-examined record includes the second flag and the comparing means indicate that the last-examined record is higher in the order than the predetermined datum; and the indication-giving means include means for giving the indication when (c) or when (d) is true.

3. The arrangement of claim 1 wherein the performing means comprise memory means having addressable storage words each for storing one record of the file, each word having a first field for indicating whether the record is of the lower range limit and a second field for indicating whether the record is of the upper range limit, comparator means for determining relative ordering of the predetermined datum and the record stored by an addressed storage word of the memory, and generating one of (c) a first signal indicating that the compared record is lower in order than the predetermined datum and (d) a second signal indicating that the compared record is higher in order than the predetermined datum, and address-sequencer means responsive to results of comparisons performed by the comparator means, for addressing individual words of the memory in a binary-search sequence, and for generating a third signal to indicate completion of the binary search;

the determining means comprise means for generating a fourth signal when either (e) the first field of an addressed word of the memory indicates that the stored record is of the lower range limit, when the first and the third signals are generated, or (f) the second field of an addressed word of the memory indicates that the stored record is of the upper range limit, when the second and the third signals are generated; and the indication-giving means give the indication when the fourth signal is generated.

4. The arrangement of claim 1 wherein:

the data file further defines at least one individual datum represented among the records by its own individual record;

the determining means include means responsive to the completion of the binary search for determining whether the last-examined one of the records (c) represents the predetermined datum; and the indication-giving means are responsive to a determination that one of (a), (b), and (c) is true, for giving an indication that the predetermined datum is included in the file.

5. The arrangement of claim 4 wherein:

the indication-giving means are further responsive to a determination that (a), (b), and (c) are not true, for giving an indication that the predetermined datum is not included in the file.

6. The arrangement of claim 1 wherein:

the data file defines a plurality of noncontiguous ranges of included data, each one of the ranges being represented among the records by a record of a lower limit of the range and a separate record of an upper limit of the range.

7. The arrangement of claim 1 wherein:

the data file defines a plurality of ranges of included data, each said range being represented among the records by a record, dedicated exclusively to said range, of the lower limit of the range and a separate record, also dedicated exclusively to said range, of the upper limit of the range.

8. The arrangement of claim 7 wherein:

the data file further defines at least one individual datum represented among the records by its own individual record;

the determining means include means responsive to the completion of the binary search for determining whether the last-examined one of the records (c) represents the predetermined datum; and the indication-giving means are responsive to a determination that one of (a), (b), and (c) is true, for giving an indication that the predetermined datum is included in the file.

9. A method of searching sequentially ordered data records of a data file, the data file defining a range of included data, the range being represented among the records by a record that is marked as a lower limit of the range and a separate record that is marked as an upper limit of the range, comprising the steps of:

performing a binary search of the file for a predetermined datum by examining the data records in a binary search sequence;

indicating completion of the search;

examining the marking and the associated data of a last-examined one of the records to determine whether the last-examined one of the records is one of (a) marked as the lower range limit and lower in order than the predetermined datum, and (b) marked as the upper range limit and higher in the order than the predetermined datum, in response to the indication of the completion of the binary search; and giving an indication that the predetermined datum is included in the file, in response to a determination that one of (a) and (b) is true.

10. The method of claim 9 for searching the ordered date records wherein the record marked as the lower limit includes a first flag identifying this record, and the record marked as the upper limit includes a second flag identifying this record, the step of performing comprises the step of comparing relative ordering of the predetermined datum with an examined data record;

the step of determining comprises the step of determining whether (c) the last-examined record includes the first flag and the last-examined record is determined to be comparatively lower in the order than the predetermined datum, or (d) the last-examined record includes the second flag and the last-examined record is determined to be comparatively higher in the order than the predetermined datum; and the step of giving an indication comprises the step of giving the indication when (c) or (d) is true.

11. The method of claim 9 for searching the ordered data records stored in a memory having addressable storage words each for storing one record of the file, each word having a first field for indicating whether the record is of the lower range limit and a second field for indicating whether the record is of the upper range limit, wherein:

the step of performing comprises the steps of addressing individual words of the memory in a binary search sequence, comparing the predetermined datum with the record stored by an addressed storage word of the memory to determine their relative ordering, generating a first signal when the compared record is lower in order than the predetermined datum, generating a second signal when the compared record is higher in order than the predetermined datum, and generating a third signal when the binary search is completed;

the step of determining comprises the steps of generating a fourth signal when the first field of an addressed word of the memory indicates that the stored record is of the lower range limit, when the first and the third signals are generated, and generating the fourth signal when the second field of an addressed word of the memory indicates that the stored record is of the upper range limit, when the second and the third signals are generated; and the step of giving an indication comprises the step of giving the indication when the fourth signal is generated.

12. The method of claim 9 for searching a data file further defining at least one individual included datum represented among the records by its own individual record, wherein:

the step of determining includes the step of determining whether the last-examined one of the records (c) represents the predetermined datum, in response to the completion of the binary search; and the step of giving an indication comprises the step of giving an indication that the predetermined datum is included in the file, in response to a determination that one of (a), (b), and (c) is true.

13. The method of claim 12 further comprising the step of:

giving an indication that the predetermined datum is not included in the file, in response to a determination that (a), (b), and (c) are not true.

14. The method of claim 9 for searching a data file defining a plurality of noncontiguous ranges of included data, each of the ranges being represented among the records by a record of a lower limit of the range and a separate record of an upper limit of the range.

15. The method of claim 9 for searching a data file defining a plurality of ranges of included data, each said range being represented among the records by a record, dedicated exclusively to said range, of the lower limit of the range and a separate record, also dedicated exclusively to said range, of the upper limit of the range.

16. The method of claim 15 for searching a data file further defining at least one individual included datum represented among the records by its own individual record, wherein:

the step of determining includes the step of determining whether the last-examined one of the records (c) represents the predetermined datum, in response to the completion of the binary search; and the step of giving an indication comprises the step of giving an indication that the predetermined datum is included in the file, in response to a determination that one of (a), (b), and (c) is true.

* * * * *